United States Patent
Amano

(10) Patent No.: US 9,114,726 B2
(45) Date of Patent: Aug. 25, 2015

(54) VEHICLE AND METHOD FOR CONTROLLING VEHICLE

(75) Inventor: Takashi Amano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/355,421

(22) PCT Filed: Nov. 4, 2011

(86) PCT No.: PCT/JP2011/075407
§ 371 (c)(1),
(2), (4) Date: Apr. 30, 2014

(87) PCT Pub. No.: WO2013/065168
PCT Pub. Date: May 10, 2013

(65) Prior Publication Data
US 2014/0324261 A1    Oct. 30, 2014

(51) Int. Cl.
B60L 9/00         (2006.01)
B60L 15/20        (2006.01)
B60K 6/445        (2007.10)
B60L 11/12        (2006.01)
B60L 11/14        (2006.01)
B60L 7/14         (2006.01)
B60L 11/00        (2006.01)
B60L 11/18        (2006.01)
B60W 10/08        (2006.01)
B60W 10/26        (2006.01)

(52) U.S. Cl.
CPC .............. B60L 15/20 (2013.01); B60K 6/445 (2013.01); B60L 7/14 (2013.01); B60L 11/005 (2013.01); B60L 11/123 (2013.01); B60L 11/14 (2013.01); B60L 11/1861 (2013.01); B60L 15/2018 (2013.01); B60L 2210/10 (2013.01); B60L 2210/40 (2013.01); B60L 2220/14 (2013.01); B60L 2240/12 (2013.01); B60L 2240/423 (2013.01); B60L 2240/527 (2013.01); B60L 2240/547 (2013.01); B60L 2240/549 (2013.01); B60L 2240/642 (2013.01); B60L 2270/145 (2013.01); B60W 10/08 (2013.01);
(Continued)

(58) Field of Classification Search
CPC ..... B60L 15/20; B60L 11/123; B60L 11/126; B60W 2550/142; B60W 2510/244; B60W 20/00; Y02T 90/12; Y02T 10/7088; Y02T 10/7005; H02J 7/16
USPC ................ 701/22, 25, 36; 180/65.265, 65.27; 320/109; 324/427
See application file for complete search history.

(56) References Cited

U.S. PATENT DOCUMENTS 7,795,841 B2 *  9/2010  Matsumoto ................... 320/109
8,565,930 B2 * 10/2013  Miwa ............................ 700/292
(Continued)

FOREIGN PATENT DOCUMENTS

JP    A-9-242579     9/1997
JP    A-2001-20771   1/2001
(Continued)

Primary Examiner — Gertrude Arthur Jeanglaude
(74) Attorney, Agent, or Firm — Oliff PLC

(57) ABSTRACT

A vehicle includes: a power storage device; a motor generator that generates traveling driving power using electric power from the power storage device; an ECU; and an inclination detecting unit for detecting inclination of a road surface. The ECU performs power changing driving in which the vehicle is traveled while switching the motor generator between a first state and a second state, driving power of a first level being generated in the first state, driving power smaller than the driving power generated in the first state being generated in the second state. When the ECU recognizes, based on the inclination detected by the inclination detecting unit, that the vehicle is traveling on a road surface having a slope, the ECU eases up at least one of an upper limit value and a lower limit value of SOC of the power storage device.

9 Claims, 9 Drawing Sheets

(52) U.S. Cl.
CPC ......... *B60W 10/26* (2013.01); *B60W 2550/142* (2013.01); *B60W 2710/086* (2013.01); *Y02T 10/6217* (2013.01); *Y02T 10/6239* (2013.01); *Y02T 10/642* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 8,648,565 B2 * | 2/2014 | Mitsutani | 320/109 |
| 2003/0037981 A1 * | 2/2003 | Scholer et al. | 180/271 |
| 2006/0102398 A1 | 5/2006 | Mizuno | |
| 2007/0114084 A1 | 5/2007 | Huelser et al. | |
| 2009/0085522 A1 * | 4/2009 | Matsumoto | 320/137 |
| 2009/0146615 A1 | 6/2009 | Zillmer et al. | |
| 2011/0035135 A1 | 2/2011 | Schwalm et al. | |

FOREIGN PATENT DOCUMENTS

| | | |
|---|---|---|
| JP | A-2002-51405 | 2/2002 |
| JP | A-2004-127747 | 4/2004 |
| JP | 2005512498 A | 4/2005 |
| JP | 2007168502 A | 7/2007 |
| JP | A-2008-520485 | 6/2008 |
| JP | 2008235160 A | 10/2008 |
| JP | A-2009-292424 | 12/2009 |
| JP | A-2009-298232 | 12/2009 |
| JP | A-2010-6309 | 1/2010 |
| JP | A-2011-11648 | 1/2011 |
| JP | 2011046272 A | 3/2011 |
| JP | A-2011-67043 | 3/2011 |

* cited by examiner

VEHICLE AND METHOD FOR CONTROLLING VEHICLE

TECHNICAL FIELD

The present invention relates to a vehicle and a method for controlling the vehicle, more particularly, control for traveling of a vehicle that travels using inertia force of the vehicle.

BACKGROUND ART

In recent years, as an environmentally friendly vehicle, a vehicle has been drawing attention which has a power storage device (such as a secondary battery or a capacitor) and which travels using driving power generated from electric power stored in the power storage device. Examples of such a vehicle include an electric vehicle, a hybrid vehicle, a fuel cell vehicle, and the like.

In order to further reduce environmental load, these vehicles are required to reduce fuel consumption and electric power consumption so as to improve energy efficiency.

Japanese National Patent Publication No. 2008-520485 (PTD 1) discloses a hybrid vehicle including an internal combustion engine and a motor generator, wherein the motor generator is controlled such that a first interval and a second interval are alternately repeated while the motor generator is in a power generator mode. In the first interval, the motor generator is driven to output high power larger than actual electric power consumption of an electric system of the vehicle. In the second interval, the motor generator is switched off.

According to Japanese National Patent Publication No 2008-520485 (PTD 1), while the motor generator operates as a power generator, the motor generator is driven at an operating point of high efficiency in the first interval, and the motor generator is stopped in the second interval. In this way, the motor generator is suppressed from being continuously driven in a state of low efficiency during the power generation operation, thereby improving energy efficiency of the vehicle during the power generation operation.

Meanwhile, Japanese Patent Laying-Open No. 2010-6309 (PTD 2) discloses a hybrid vehicle including an internal combustion engine and a motor generator, wherein traveling using driving power generated by the internal combustion engine and traveling in an inertia state with the internal combustion engine being stopped are alternately repeated. In this way, the internal combustion engine can be driven at an operating point of high efficiency, thereby achieving improved fuel consumption.

CITATION UST

Patent Document

PTD 1: Japanese National Patent. Publication No. 2008-520485
PTD 2: Japanese Patent Laying-Open No. 2010-6309
PTD 3: Japanese Patent Laying-Open No. 2001-020771
PTD 4: Japanese. Patent Laying-Open No. 2009-292424
PTD 5: Japanese Patent Laving-Open No, 2009-298232

SUMMARY OF INVENTION

Technical Problem

Japanese National Patent Publication No. 2008-520485 (PTD 1) described above presents the configuration in which driving and stopping of the motor generator are repeated when performing electric power generation using the motor generator. In Japanese National Patent Publication No. 2008-520485 (PTD 1), driving power for traveling of the vehicle is not changed.

Meanwhile, Japanese Patent Laying-Open No. 2010-6309 (PTD 2) discloses the hybrid vehicle in which the acceleration/inertia traveling control is performed by repeating driving and stopping of an engine, which is the internal combustion engine. In Japanese Patent Laying-Open No. 2010-6309 (PTD 2), driving of the motor generator is not taken into consideration.

When inclination of a road surface is changed during the acceleration/inertia traveling of the vehicle in Japanese Patent Laying-Open No. 2010-6309 (PTD 2), acceleration/deceleration of the vehicle is influenced by gravity acting on the vehicle. Accordingly, in order to maintain the vehicle speed, it is necessary to control an output of the driving source in accordance with the change in inclination of the road surface. Japanese Patent Laying-Open No. 2010-6309 (PTD 2) does not describe specific control in the case where there is a change in inclination of the road surface on which the vehicle travels.

The present invention has been made to solve such a problem, and has its object to appropriately improve energy efficiency in consideration of a change in inclination of a road surface during traveling of a vehicle capable of traveling using driving power from a motor generator.

Solution to Problem

A vehicle according to the present invention includes: a power storage device; a rotating electrical machine that generates traveling driving power for the vehicle using electric power from the power storage device; a control device for controlling the rotating electrical machine; and an inclination detecting unit for detecting inclination of a road surface. The control device performs power changing driving in which the vehicle is traveled while switching the rotating electrical machine between a first state and a second state, driving power of a first level being generated in the first state, driving power in the second state being made smaller than the driving power in the first state. When the control device recognizes, based on the inclination detected by the inclination detecting unit, that the vehicle is traveling on a road surface having a slope, the control device eases up at least one of an upper limit value and a lower limit value of a state of charge, the upper limit value and the lower limit value defining a permitted range of charging/discharging for the power storage device.

Preferably, when the vehicle is traveling on a downhill, the control device causes the rotating electrical machine to perform regenerative operation so as to provide the vehicle with braking force and charge the power storage device with electric power generated by the rotating electrical machine in the second state. When the vehicle is traveling on the downhill, the control device increases the upper limit value of the state of charge of the power storage device as compared with the upper limit value employed for traveling of the vehicle on a flat road.

Preferably, when the vehicle is traveling on an uphill, the control device increases the driving power in the second state as compared with the driving power employed for traveling of the vehicle on a flat road. When the vehicle is traveling on the uphill, the control device decreases the lower limit value of the state of charge of the power storage device as compared with the traveling of the vehicle on the flat road.

Preferably, the control device performs the power changing driving when a change in user's requested driving power falls within a predetermined range.

Preferably, while the power changing driving is performed, the control device switches between the first and second states so as to maintain speed of the vehicle in a permitted range.

Preferably, the control device makes switching to the first state in response to decrease of the speed of the vehicle to a lower limit value of the permitted range, and makes switching to the second state in response to increase of the speed of the vehicle to an upper limit value of the permitted range.

Preferably, the vehicle further includes another driving source that generates the traveling driving power of the vehicle. The control device performs power changing driving in which the another driving source is switched between a third state and a fourth state, driving power of a second level being generated in the third state, driving power in the fourth state being made smaller than the driving power in the third state.

Preferably, the another driving source is an engine.

Preferably, the another driving source is another rotating electrical machine different from the rotating electrical machine.

A method for controlling a vehicle in the present invention is a method for controlling a vehicle including a power storage device, a rotating electrical machine that generates traveling driving power for the vehicle using electric power from the power storage device, and an inclination detecting unit for detecting inclination of a road surface. The method includes the steps of bringing the rotating electrical machine into a first state in which driving power of a predetermined level is generated; bringing the rotating electrical machine into a second state in which driving power is made smaller than the driving power in the first state; performing power changing driving in which the vehicle is traveled while switching between the first and second states; and easing up at least one of an upper limit value and a lower limit value of a state of charge when recognizing, based on the inclination detected by the inclination detecting unit, that the vehicle is traveling on a road surface having a slope, the upper limit value and the lower limit value defining a permitted range of charging/discharging for the power storage device.

Advantageous Effects of Invention

According to the present invention, energy efficiency can be appropriately improved in consideration of a change in inclination of a road surface during traveling of a vehicle capable of traveling using driving power from a motor generator.

DESCRIPTION OF EMBODIMENTS

Figure 1:
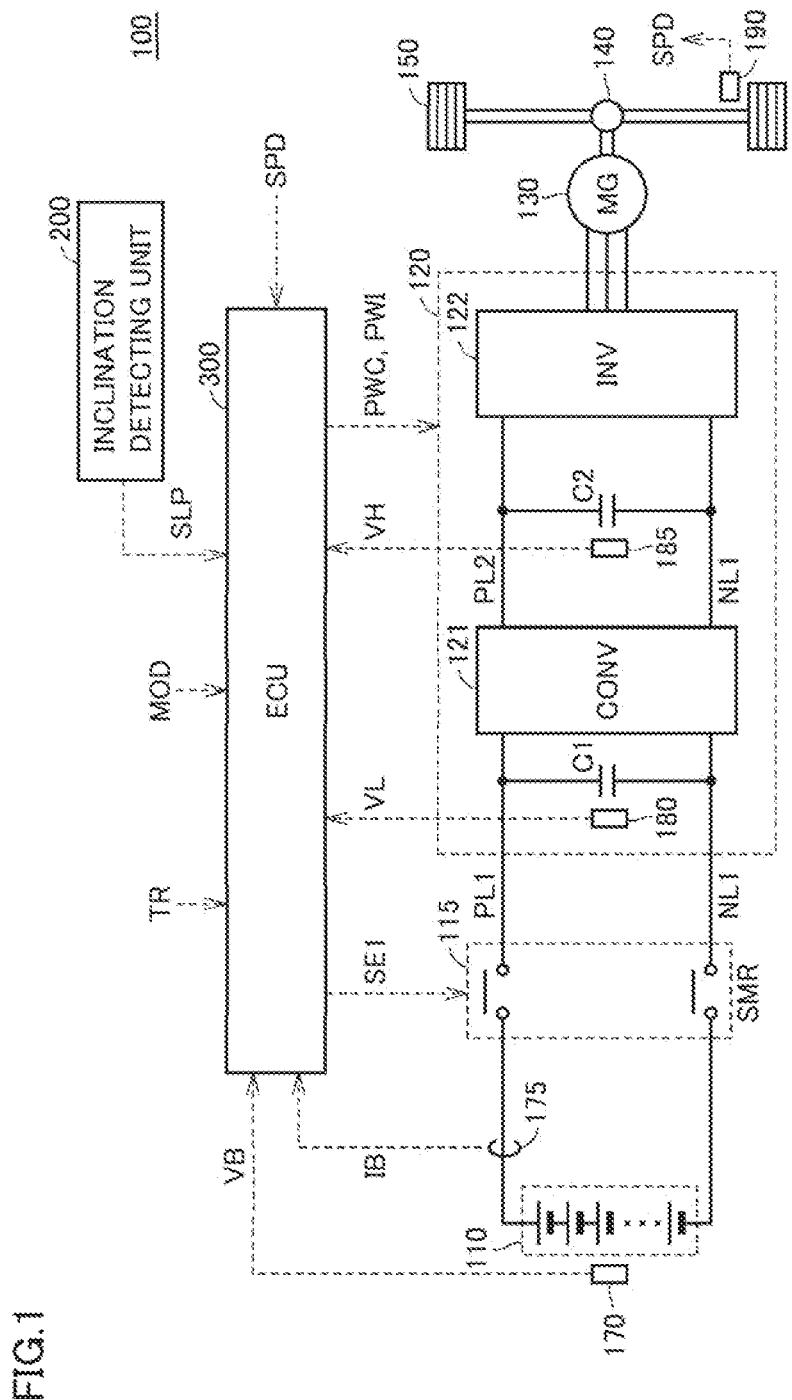
FIG. 1 is an overall block diagram of a vehicle according to a first embodiment.

The following describes embodiments of the present invention in detail with reference to figures. It should be noted that the same or corresponding portions in the figures are given the same reference characters and are not described repeatedly.

[First Embodiment]

FIG. 1 is an overall block diagram of a vehicle 100 according to a first embodiment of the present invention. As described in detail below, vehicle 100 is an electric vehicle or a fuel cell vehicle, which employs a rotating electrical machine as a driving source.

Referring to FIG. 1, vehicle 100 includes: a power storage device 110; a system main relay (SMR) 115; a PCU (Power Control Unit) 120 serving as a driving device; a motor generator 130; a power transmission gear 140; driving wheels 150; an inclination detecting unit 200; and an ECU (Electronic Control Unit) 300 serving as a control device. PCU 120 includes a converter 121, an inverter 122, voltage sensors 180, 185, and capacitors C1, C2.

Power storage device 110 is a power storage component configured to be chargeable/dischargeable. Power storage device 110 is configured to include a secondary battery such as a lithium ion battery, a nickel-hydrogen battery, or a lead storage battery, or include a storage element such as an electric double layer capacitor, for example.

Power storage device 110 is connected to PCU 120 via power lines PL1 and NL1. Power storage device 110 supplies electric power to ECU 120 so as to generate driving power of vehicle 100. Further, power storage device 110 stores electric power generated by motor generator 130. Power storage device 110 has an output of, for example, approximately 200 V.

Power storage device 110 is provided with a voltage sensor 170 and a current sensor 175. Voltage sensor 170 detects a voltage VB of power storage device 110, and sends a detection result thereof to ECU 300. Current sensor 175 detects a current IB sent to/received from the power storage device, and sends a detection value thereof to ECU 300.

SMR 115 includes a relay having one end connected to a positive electrode terminal of power storage device 110 and the other end connected to power line PL1 that is connected to PCU 120, and another relay having one end connected to a negative electrode of power storage device 110 and the other end connected to power line NL1 that is connected to PCU. Further, SMR 115 makes switching to supply or cut off electric power between power storage device 110 and PCU 120, based on a control signal SE1 sent from ECU 300.

Converter 121 performs voltage conversion between power lines PL1, NL1 and each of power lines PL2, NL1, based on a control signal PWC sent from ECU 300.

Inverter 122 is connected to power lines PL2, NL1. Based on a control signal PWI sent from ECU 300, inverter 122 converts direct-current power, which is supplied from converter 121, into alternating-current power so as to drive motor generator 130.

Capacitor C1 is provided between power lines PL1 and NL1, and reduces voltage fluctuation between power lines PL1 and NL1. Further, capacitor C2 is provided between power lines PL2 and NL1, and reduces voltage fluctuation between power lines PL2 and NL1.

Voltage sensor 180 detects a voltage VL applied across capacitor C1 and sends a detection value thereof to ECU 300. Voltage sensor 185 detects a voltage VH applied across capacitor C2, and sends a detection value thereof to ECU 300.

Motor generator 130 is an alternating-current rotating electrical machine, such as a permanent-magnet type synchronous motor including a rotor having a permanent magnet embedded therein.

Output torque from motor generator 130 is transmitted to driving wheels 150 via power transmission gear 140, which is configured to include a speed reducer and a power split device. In this way, vehicle 100 travels. Motor generator 130 is capable of generating electric power using rotation of driving wheels 150 when vehicle 100 operates for regenerative braking. The electric power thus generated is converted by PCU 120 into charging power for power storage device 110.

In order to detect speed of vehicle 100 (vehicle speed), a speed sensor 190 is provided adjacent to driving wheel 150. Speed sensor 190 detects vehicle speed SPD based on rotational speed of driving wheel 150, and sends a detection value thereof to ECU 300. Further, as the speed sensor, there may be employed a rotational angle sensor (not shown) for detecting rotation angle of motor generator 130. In this case, ECU 300 indirectly calculates vehicle speed SPD based on a change of rotation angle of motor generator 130 with time as well as a deceleration ratio.

Inclination detecting unit 200 detects inclination of a road surface on which vehicle 100 is traveling. Then, inclination detecting unit 200 sends a detection value SLP of the detected inclination to ECU 300. As inclination detecting unit 200, an inclination sensor, a G sensor, or the like can be used, for example.

Although not shown in FIG. 1, ECU 300 includes a CPU (Central Processing Unit), a memory device, and an input/output buffer, so as to receive signals from sensors, send control signals to devices, and control devices in power storage device 110 and vehicle 100. It should be noted that processing for these controls is not limited to software processing, and can be implemented by dedicated hardware (electronic circuit).

ECU 300 generates and sends control signals for controlling PCU 120, SMR 115, and the like. It should be noted that in FIG. 1, one control device is provided as ECU 300, but individual control devices may be respectively provided based on functions or devices to be controlled, such as a control device for PCU 120 and a control device for power storage device 110.

ECU 300 calculates a SOC (State of Charge) of power storage device 110 based on the detection values of voltage VB and current IB from voltage sensor 170 and current sensor 175 provided in power storage device 110.

From an upper-level ECU (not shown), ECU 300 receives a requested torque TR set based on a user's operation on an accelerator pedal (not shown). Based on the user's requested torque TR, ECU 300 generates respective control signals PWC, PWI for converter 121 and inverter 122 so as to drive motor generator 130.

Further, ECU 300 receives a mode signal MOD set by the user. This mode signal MOD is a signal indicating whether to perform inertia traveling control described below. Mode signal MOD is switched by a specific switch, settings on an operation screen, or the like. Alternatively, mode signal MOD may be automatically set in response to establishment of a specific condition.

For example, when mode signal MOD is set at ON, ECU 300 operates to perform the inertia traveling control. On the other hand, when mode signal MOD is set at OFF, ECU 300 operates to perform normal traveling in which the inertia traveling control is not performed.

In such a vehicle, electric power of the power storage device is consumed when driving power is generated from motor generator 130. The capacity of power storage device 110 is determined in advance. Hence, in order to travel a distance as long as possible using electric power stored in the power storage device, it is necessary to improve energy efficiency during traveling and reduce power consumption.

During traveling of the vehicle, inertia force acts on the vehicle. Hence, when driving power generated by the motor generator during traveling is made lower than driving power required to maintain the vehicle speed, the vehicle speed is gradually decreased but the traveling continues for a while using the inertia force of the vehicle (hereinafter, this traveling is also referred to as "inertia traveling").

During this inertia traveling, the driving power output by the motor generator is small to result in small consumption of electric power from the power storage device. Hence, if such inertia traveling can be utilized in traveling, energy efficiency during vehicle traveling can be improved.

In view of this, in the first embodiment, improvement of energy efficiency during traveling is achieved in the following manner. That is, in the vehicle shown in FIG. 1, when the vehicle is traveling while the user's requested torque is substantially constant and accordingly the vehicle speed is maintained to be substantially constant, the inertia traveling control is performed to implement driving in which acceleration traveling and inertia traveling are repeatedly performed (hereinafter, also referred to as "power changing driving"). In the acceleration traveling, high driving power is output from the motor generator. In the inertia traveling, low driving power (inclusive of a case where driving power is zero) is output from the motor generator.

Further, in the first embodiment, the above-described inertia traveling control is applied to traveling on a road surface having inclination, such as a downhill and an uphill. However, deceleration can be increased/decreased due to influence of gravity acting on the vehicle during inertia traveling on such a road surface having inclination, as compared with deceleration during traveling on a flat road. Accordingly, when the inclination is changed during the power changing driving, the driver may be provided with torque shock as a result of the change in deceleration.

In order to address such fluctuation in deceleration, during the inertia traveling, the motor generator may be controlled to generate torque to cancel the deceleration fluctuation resulting from the influence of gravity so as to attain substantially the same level of deceleration for the deceleration in the case of traveling on a flat road and the deceleration in the case of traveling on a downhill or an uphill.

(Case of Downhill)

In the case of a downhill, deceleration is reduced by gravity, with the result that the vehicle speed is less likely to decrease. By the motor generator generating regenerative torque during the inertia traveling, the deceleration reduced by gravity is compensated for.

Here, when regenerative braking is performed on a downhill, the motor generator generates electric power through the regenerative braking and the generated electric power is stored in the power storage device. However, in this case, when and after the SOC in the power storage device has reached the upper limit value of the permitted use range, the power storage device cannot be charged. Accordingly, no regenerative operation can be performed during the inertia traveling. Accordingly, for example, when traveling on a long downhill, the regenerative operation is stopped in the middle of the downhill, with the result that deceleration during the inertia traveling is changed to presumably affect the driver's feeling.

To address this, in the first embodiment, when performing the inertia traveling control on a downhill, the upper limit value, which defines the permitted use range of the SOC of the power storage device, is set at a large value by temporarily easing it up. In this way, regenerative braking during the inertia traveling can be continued as long as possible, thereby improving drivability.

It should be noted that the upper limit value of the permitted use range of the SOC is generally provided with a certain margin for a critical value immediately leading to breakage of the power storage device. Further, a period of time during which a downhill continues is relatively short. Hence, even though the upper limit value is eased up during such a short period of time during which a downhill continues, the power storage device is quite unlikely to be immediately deteriorated or broken.

Figure 2:
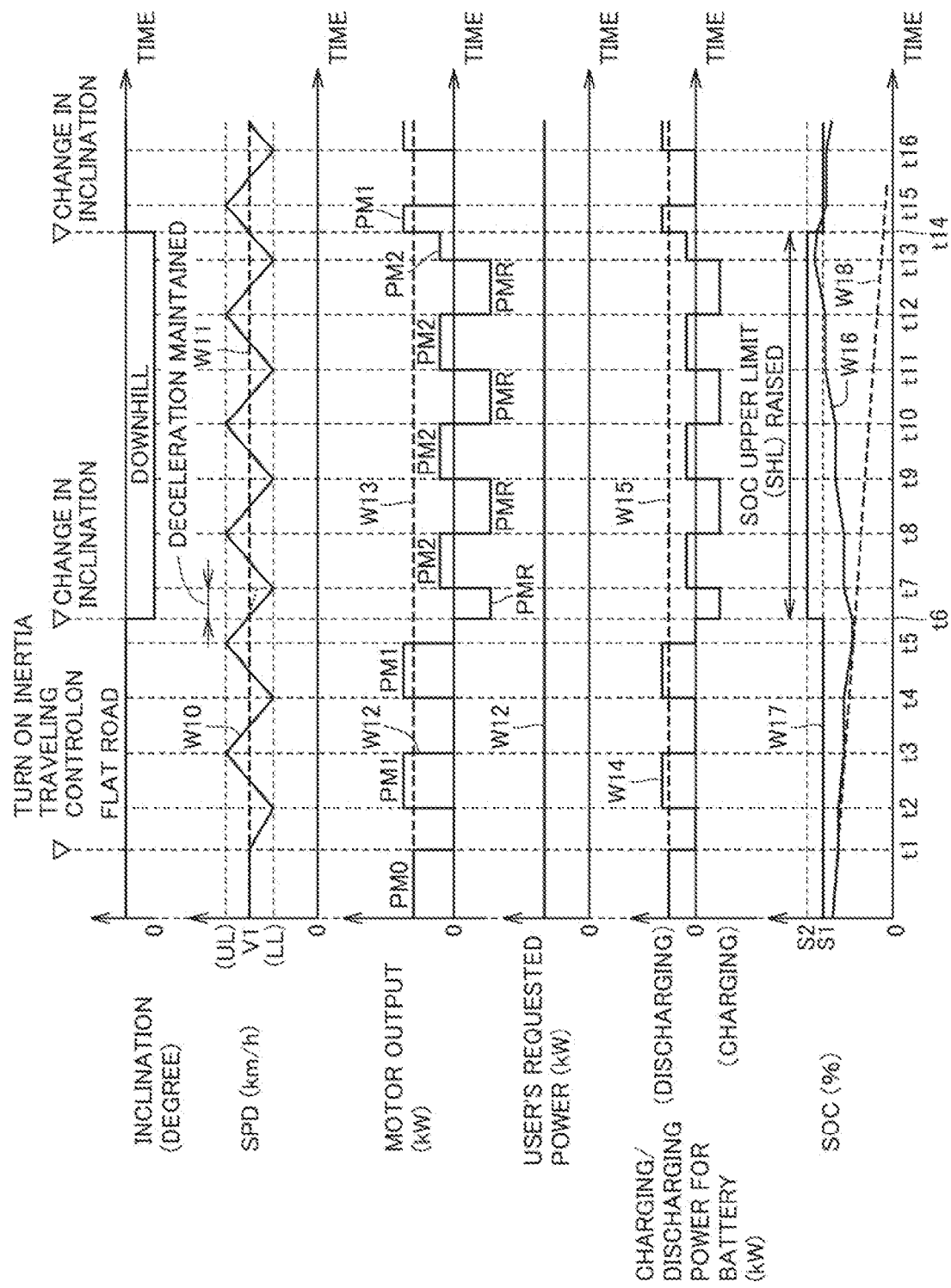
FIG. 2 is a time chart for illustrating gist of inertia traveling control when traveling on a downhill in the first embodiment.

FIG. 2 illustrates the inertia traveling control when vehicle 100 travels on a downhill in the first embodiment. In FIG. 2, the horizontal axis represents time. The vertical axis represents inclination of the road surface, vehicle speed SPD, output of the motor generator, the user's requested power, charging/discharging power for the power storage device (battery), and the SOC of the power storage device. Regarding the charging/discharging power for the power storage device, the discharging power is indicated by a positive value, and the charging power is indicated by a negative value.

Referring to FIG. 1 and FIG. 2, first, it is assumed that vehicle 100 is traveling on a flat road at a constant vehicle speed V1 (a period of time to t6). In this case, as shown in FIG. 2, the user's requested power is given as a substantially constant value. It should be noted that the expression "the user's requested power is given as a substantially constant value" is intended to indicate a state in which the user's requested power is slightly fluctuated but is maintained to fall within a predetermined range (for example, ±3%) during a predetermined period of time.

When the inertia traveling control in the first embodiment is not applied, the output of motor generator 130 is substantially constant in magnitude in a continuous manner as indicated by a broken line W13 in FIG. 2. Accordingly, vehicle speed SPD is maintained to be substantially constant as indicated by a broken line W11 in FIG. 2.

On this occasion, constant electric power is continuously output from power storage device 110 as indicated by a broken line W15 in FIG. 2. Accordingly, the SOC of power storage device 110 is linearly decreased as indicated by a broken line W18 in FIG. 2.

When vehicle 100 reaches an downhill involving a change in inclination of the road surface at time t6, gravity acting on vehicle 100 has an influence to substantially increase driving power acting in the vehicle traveling direction, thus resulting in decreased deceleration. This leads to increased acceleration. Accordingly, the vehicle speed is increased, with the result that the vehicle speed cannot be presumably maintained in the permitted range. As a result, a distance from a vehicle traveling before vehicle 100 becomes gradually shorter to presumably result in collision or the like.

Meanwhile, in the case where the inertia traveling control in the first embodiment is applied, the acceleration traveling with motor generator 130 being operated to provide predetermined driving power and the inertia traveling with motor generator 130 being operated to provide driving power less than that in the acceleration traveling are basically alternately repeated. It should be noted that the inertia traveling includes a case where the driving power from motor generator 130 is zero, i.e., a case where motor generator 130 is stopped. As an example, FIG. 2 illustrates that motor generator 130 is stopped during the inertia traveling on a flat road.

Specifically, until time t1, the inertia traveling control in the first embodiment is not applied, and a motor output PM0 is continuously output.

When the user instructs at time t1 to perform the inertia traveling control, motor generator 130 is first stopped (a solid line W12 in FIG. 2). Accordingly, no driving power is supplied from motor generator 130, with the result that the traveling using inertia force is started and vehicle speed SPD is gradually decreased as indicated by a solid line W10 in FIG. 2.

On this occasion, the charging/discharging power from power storage device 110 becomes zero, thereby suppressing decrease of the SOC.

Then, when vehicle speed SPD is decreased to a lower limit value LL of a predetermined permitted range set relative to a target vehicle speed V1 (at time t2 in FIG. 2), driving of motor generator 130 is resumed. Motor output on this occasion is set at PM1, which is larger than output PM0 required to maintain vehicle speed V 1. Accordingly, vehicle 100 is accelerated. On this occasion, although an amount of decrease of the SOC becomes larger during generation of the driving power than that in the case were no inertia traveling is performed, electric power has not been consumed in the inertia traveling during the period of time t1 to t2. Accordingly, the total SOC is maintained to be high (a solid line W16 in FIG. 2).

Then, when vehicle speed SPD is increased to an upper limit value UL of the above-described predetermined permitted range, motor generator 130 is stopped again (at time t3 in FIG. 2), thereby performing the inertia traveling.

Thereafter, similarly when vehicle speed SPD is decreased to lower limit value LL, motor generator 130 is driven. Then, when vehicle speed SPD is increased to upper limit value UL, motor generator 130 is stopped.

By repeating such power changing driving, although vehicle speed SPD is fluctuated in the above-described permitted range, the average speed can be maintained substantially at V1, while suppressing decrease of the SOC of the power storage device. As a result, energy efficiency is improved as a whole, thereby achieving traveling in a longer distance using electric power stored in the power storage device.

Then, when vehicle 100 is traveled to reach a downhill involving a change in inclination of the road surface at time t6, the driving power of motor generator 130 in the acceleration traveling is reduced to PM2 (<PM1) in response to the change in inclination. Thus, driving power corresponding to the gravity acting on the vehicle can be reduced by decreasing the driving power of motor generator 130, with the result that increase of the vehicle speed can be suppressed.

Further, during the inertia traveling on the downhill, motor generator 130 is controlled to provide an output PMR allowing for generation of negative torque (regenerative torque). Accordingly, the acceleration resulting from the gravity acting thereon is canceled, whereby the deceleration can be maintained as large as the deceleration during the inertia traveling on the flat road.

While motor generator 130 is performing the regenerative operation, motor generator 130 generates electric power. When braking force PMR resulting from the regenerative operation during the inertia traveling is larger than driving power PM2 for the acceleration traveling, as indicated by a solid line W16 in FIG. 2, the SOC is gradually increased during the traveling on the downhill.

During the traveling on the downhill, upper limit value SHL, which defines the permitted use range of the SOC, is raised to be S2, which is larger than S1 for the flat road traveling (S1<S2) (a solid line W17 in FIG. 2). In this way, until the SOC reaches the increased upper limit value S2 during the traveling on the downhill while performing the inertia traveling control, the regenerative operation during the inertia traveling is permitted (time t12 to t13 in FIG. 2).

When re-entering a flat road at time t14, the upper limit value of the SOC is brought back to S1, which is the normal one.

It should be noted that the motor output for traveling on a downhill may be set to attain the same acceleration as the acceleration attained during traveling on a flat road by canceling the influence of gravity, or may be set such that a total of the time of the acceleration traveling and the time of the inertia traveling while traveling on the flat road is the same as a total of the time of the acceleration traveling and the time of the inertia traveling while traveling on the downhill, for example. Further, the motor output is desirably changed in accordance with a degree of inclination. In the case where the inclination of the downhill is further increased, the motor output may be correspondingly decreased.

Moreover, in FIG. 2, it has been illustrated that the inclination is changed stepwisely, but in the case where the inclination is continuously increased, the motor output may be correspondingly increased in a continuous manner.

In the inertia traveling control of the first embodiment, as described above, the power changing driving shown in FIG. 2 is performed when the user's requested power is substantially constant. Meanwhile, during acceleration and deceleration in which the user's requested power is fluctuated, the power changing driving is not performed. During the acceleration in which the user's requested power is increased, driving power is continuously output from motor generator 130 so as to accelerate the vehicle. On the other hand, during the deceleration in which the user's requested power is decreased, driving power from motor generator 130 is stopped or decreased to reduce the speed to a desired vehicle speed.

Figure 3:
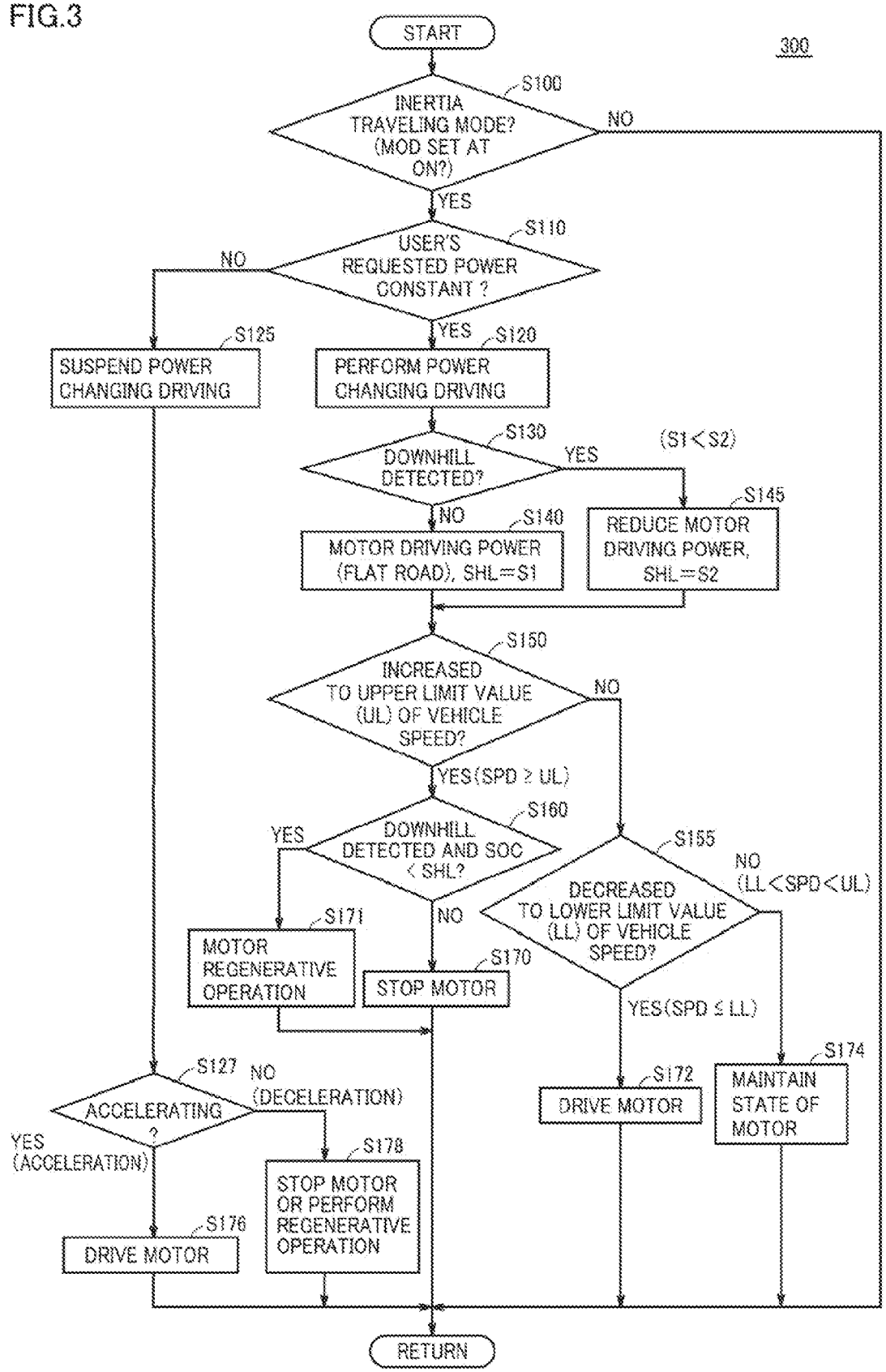
FIG. 3 is a flowchart for illustrating an inertia traveling control process performed by an ECU when traveling on the downhill.

FIG. 3 is a flowchart for illustrating an inertia traveling control process performed by ECU 300 when traveling on a downhill in the first embodiment. Each of steps in flowcharts shown in FIG. 3 as well as FIG. 5 and FIG. 8 described below is implemented by executing a program, stored in advance in ECU 300, at a predetermined cycle. Alternatively, a part of the steps can be implemented by dedicated hardware (electronic circuit) constructed for the processing.

Referring to FIG. 1 and FIG. 3, in a step (hereinafter, the word "step" will be abbreviated as "S") 100, ECU 300 determines whether or not the inertia traveling control is selected, based on mode signal MOD set by the user.

When mode signal MOD is set at OFF and the inertia traveling control is not selected (NO in S100), processes after this are skipped and ECU 300 returns the process to a main routine.

When mode signal MOD is set at ON and the inertia traveling control is selected (YES in S100), the process proceeds to S110. In S110, ECU 300 then determines whether or not the user's requested power is substantially constant, based on requested torque TR.

When the user's requested power is substantially constant (YES in S110), the process proceeds to S120. In S120, ECU 300 makes selection to perform the power changing driving. It should be noted that although not shown in FIG. 3, motor generator 130 is first stopped and the inertia traveling is performed just after the start of the power changing driving as shown in FIG. 2.

Next, based on signal SLP from inclination detecting unit 200, ECU 300 determines in S130 whether or not an downhill has been detected.

When the downhill has not been detected (NO in S130), the process proceeds to S140. In S140, ECU 300 sets the driving power for flat road as the motor driving power in the acceleration traveling, and sets upper limit value SHL of the SOC of power storage device 110 at S1. Thereafter, the process proceeds to S150.

Meanwhile, when the downhill has been detected (YES in S130), the process proceeds to S145. In S145, in accordance with inclination thereof, ECU 300 sets the driving power to be decreased as compared with that in the case of flat road, as the motor driving power in the acceleration traveling, and sets upper limit value SHL of the SOC at S2 (>S1). Then, ECU 300 proceeds the process to S150.

Then, ECU 300 determines in S150 whether or not vehicle speed SPD has been increased to upper limit value UL of the permitted speed range.

As described above, motor generator 130 is first stopped and the inertia traveling is performed just after the start of the power changing driving. Hence, vehicle speed SPD is lower than upper limit value UL, and vehicle speed SPD is gradually decreased.

In other words, because vehicle speed SPD has not been increased to upper limit value UL of the permitted speed range (NO in S150), the process proceeds to S155. In S155, ECU 300 then determines whether or not vehicle speed SPD has been decreased to lower limit value LL of the permitted speed range.

In the case where vehicle speed SPD is being decreased within the permitted speed range (LL<SPD<UL), i.e., in the case where vehicle speed SPD has not been decreased to lower limit value LL of the permitted speed range (NO in S155), the process proceeds to S174. In S174, ECU 300 maintains the present state of motor generator 130 and continues the inertia traveling. Thereafter, the process is returned to the main routine, and the process is performed again from S100 in the next control cycle.

In the case where vehicle speed SPD is decreased to lower limit value LL of the permitted speed range (SPD≤LL) while the inertia traveling is continued (YES in (S155), the process proceeds to S172. In S172, ECU 300 drives motor generator 130 using the driving power set in S140 or S145, thereby performing acceleration traveling. Accordingly, vehicle speed SPD is increased.

While the vehicle speed is being increased within the permitted speed range by performing this acceleration traveling, NO is selected in S150 and S155. Accordingly, ECU 300 continues the acceleration traveling until vehicle speed SPD reaches upper limit value UL of the permitted speed range in S174.

It should be noted that when the vehicle re-enters a flat road from the downhill while performing the acceleration traveling, the motor driving power is brought back to the driving power for flat road in S130 and S140.

When vehicle speed SPD is increased to upper limit value UL of the permitted speed range (YES in S150), ECU 300 switches from the acceleration traveling to the inertia traveling, and proceeds the process to S160 so as to determine whether or not vehicle 100 is currently traveling on a downhill and the SOC of power storage device 110 is less than upper limit value S2 set in S145.

When vehicle 100 is currently traveling on a downhill and the SOC of power storage device 110 is less than upper limit value S2 set in S145 (YES in S160), the process proceeds to S171. In S171, ECU 300 performs the inertia traveling while maintaining the deceleration as large as that in the flat road traveling with the regenerative operation of motor generator 130 being performed.

Meanwhile, when vehicle 100 is not traveling on a downhill or when vehicle 100 is traveling on a downhill and the SOC becomes equal to or more than upper limit value S2 (NO in S160), the process proceeds to S170. In S170, ECU 300 performs the inertia traveling with motor generator 130 being stopped.

While the user's requested power is maintained to be substantially constant, the above-described power changing driving is performed to maintain vehicle speed SPD in the permitted speed range.

Meanwhile, when the user's requested power is fluctuated for acceleration or deceleration (NO in S110), the process proceeds to S125. In S125, ECU 300 suspends the power changing driving.

When instructed to accelerate by means of the user's requested power (YES in S127), ECU 300 drives motor generator 130 in a power running state to accelerate vehicle 100 (S176).

Meanwhile, when the user has instructed to decelerate (NO in S127), the process proceeds to S148. In S148, ECU 300 performs deceleration by means of the inertia traveling with motor generator 130 being stopped (S178). Alternatively, in the case where more prompt deceleration is required, ECU 300 performs deceleration involving regenerative braking with motor generator 130 being driven in a regenerative state. Alternatively, the deceleration may be performed by switching between the deceleration employing the inertia traveling and the deceleration involving the regenerative braking.

Thereafter, when the user's acceleration or deceleration operation is ended and the user's requested power becomes substantially constant (YES in S110), the power changing driving is resumed.

By performing the control in accordance with the process described above, the power changing driving, in which the inertia traveling and the acceleration traveling are repeatedly performed, can be performed when the user's requested power is substantially constant. When traveling on a downhill involving a change in inclination of the road surface, the driving power of the motor generator is reduced in accordance with increase of the inclination in the downward direction. Further, during the downhill traveling, the upper limit value of the SOC of the power storage device is eased up, thereby continuing the regenerative operation of the motor generator for a longer time during the inertia traveling. Accordingly, the same level of deceleration as that in the traveling on a flat road can be maintained as long as possible. In this way, the vehicle speed can be suppressed from being increased on the downhill due to influence of gravity, while improving energy efficiency during the vehicle traveling. Also, driveability during the traveling on the downhill can be improved.

(Case of Uphill)

In the case of the uphill, in order to compensate for deceleration increased by gravity, the motor generator generates driving power corresponding to the deceleration increased during the inertia traveling.

On this occasion, when generating the driving power during the inertia traveling on the uphill, the power storage device further outputs electric power. However, in this case, when and after the SOC in the power storage device has reached the lower limit value of the permitted use range, the power storage device cannot output electric power. Accordingly, the inertia traveling control cannot be continued.

To address this, in the first embodiment, when performing the inertia traveling control on an uphill, the lower limit value, which defines the permitted use range of the SOC of the power storage device, is set at a smaller value by temporarily easing it up. Accordingly, the inertia traveling control is continued at least until the vehicle finishes traveling up the uphill, thereby preventing traffic jam or collision from being presumably caused due to decreased speed during the traveling on the uphill.

It should be noted that when the SOC falls below the lower limit value, electric power is generally prohibited from being output from the power storage device. However, as with the case of downhill, some margin is usually provided with respect to a state in which electric power in the power storage device is completely consumed. Hence, even when the SOC falls below the lower limit value, electric power remaining in the power storage device may be permitted to be used for a short time for emergency by permitting use of the electric power of the power storage device to a lower SOC by using a switch or the like, for example. In this way, the traveling can be continued to at least the nearest charging station.

Figure 4:
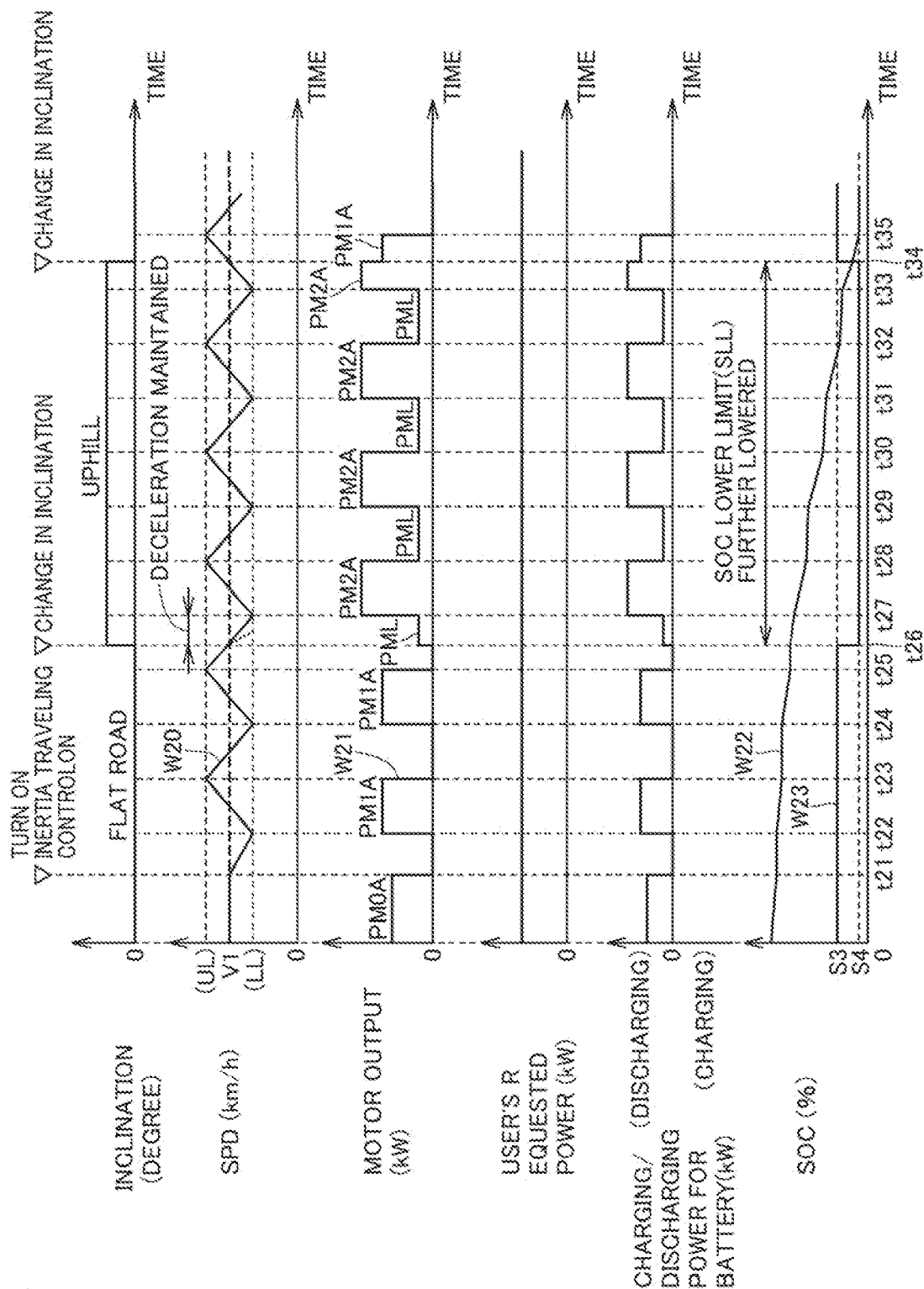
FIG. 4 is a time chart for illustrating gist of inertia traveling control when traveling on an uphill in the first embodiment.

FIG. 4 illustrates the inertia traveling control when vehicle 100 travels on an uphill in the first embodiment.

Referring to FIG. 1 and FIG. 4, until time t26, as with the case of downhill as shown in FIG. 2, vehicle 100 travels on a flat road by performing the inertia traveling control in which motor generator 130 is driven and is stopped repeatedly.

When entering an uphill from the flat road at time t26, the driving power for acceleration traveling is increased to PM2A from driving power PM1A for flat road in order to compensate for deceleration increased due to influence of gravity acting on the vehicle.

Further, also in the inertia traveling, motor generator 130 outputs low driving power PML to compensate for deceleration increased due to influence of gravity acting on the vehicle. Accordingly, the deceleration for inertia traveling on an uphill can be maintained at the same level as the deceleration for inertia traveling on a flat road.

Further, while traveling on the uphill during a period of time t26 to t34 in FIG. 4, lower limit value SLL, which defines the permitted use range of the SOC, is set at S4 (<S3), which is less than lower limit value S3 for traveling on flat road (a solid line W23 in FIG. 4).

Accordingly, even when the SOC falls below the normal lower limit value S3 as in the period of time around t32 to t34 in FIG. 4, the inertia traveling control can be continued using electric power from power storage device 110 until the vehicle finishes traveling up the uphill.

Figure 5:
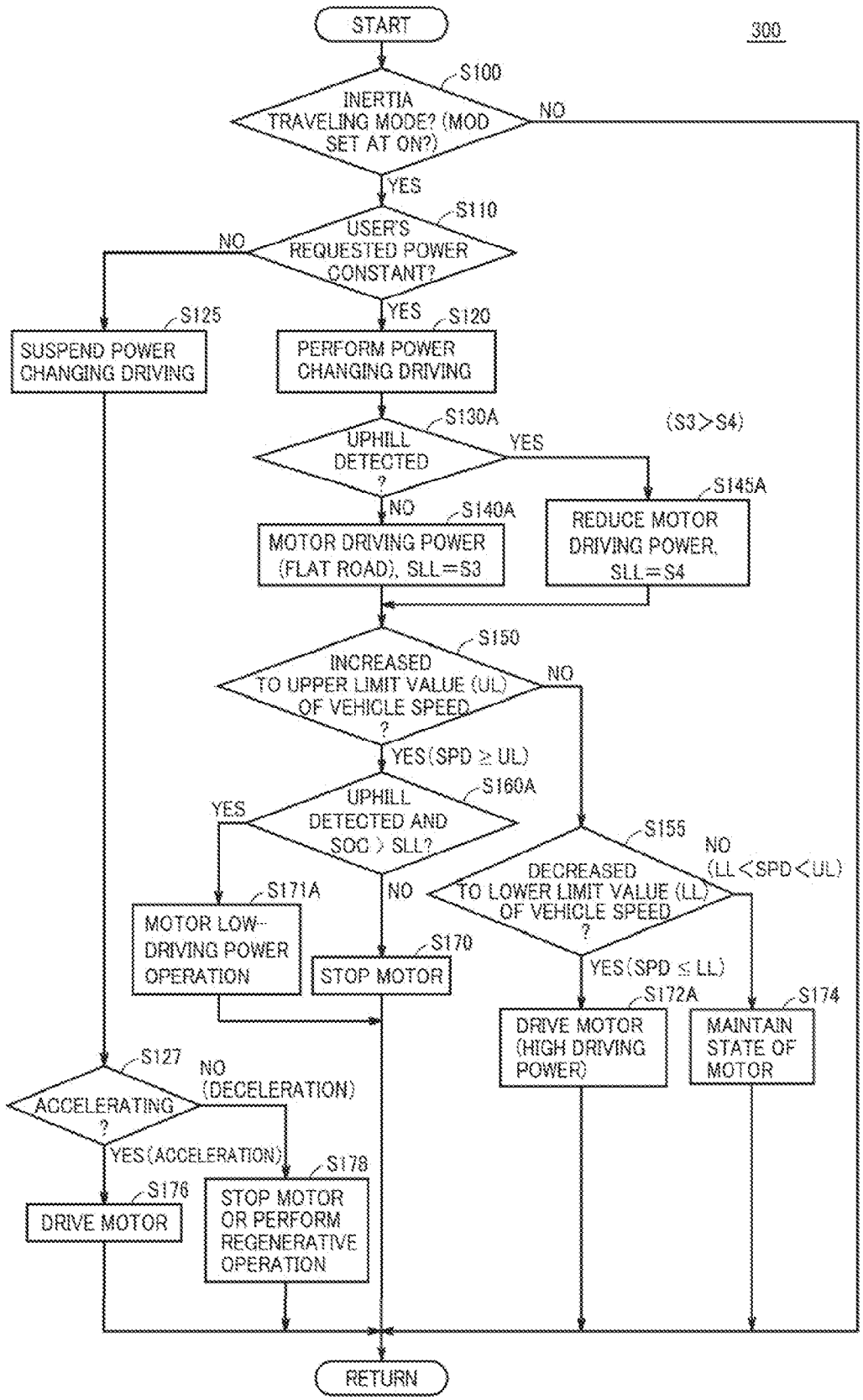
FIG. 5 is a flowchart for illustrating an inertia traveling control process performed by an ECU when traveling on the uphill.

FIG. 5 is a flowchart for illustrating an inertia traveling control process performed by ECU 300 when traveling on an uphill. FIG. 5 is a figure in which steps S130, S140, S145, S160, S171, and S172 for the downhill in the flowchart of FIG. 3 are respectively replaced with S130A, S140A, S145A, S160A, S171A, and S172A. In FIG. 5, the same steps as those in FIG. 3 are not described repeatedly.

Referring to FIG. 1 and FIG. 5, when the inertia traveling control is selected (YES in S100) and the user's requested power is determined as being substantially constant (YES in S110) to start the power changing driving (S120), the process proceeds to S130A in which ECU 300 determines, based on signal SLP from inclination detecting unit 200, whether or not vehicle 100 is currently traveling on an uphill.

When the uphill has not been detected (NO in S130A), the process proceeds to S140A. In S140A, ECU 300 sets the driving power for flat road as the motor driving power in the acceleration traveling, and sets lower limit value SLL of the SOC of power storage device 110 at S3.

Meanwhile, when the uphill has been detected (YES in S130A), the process proceeds to S145A. In S145A, in accordance with inclination thereof, ECU 300 sets the driving power to be increased as compared with that in the case of flat road, as the motor driving power for acceleration traveling, and sets lower limit value SLL of the SOC at S4 (<S3).

When vehicle speed SPD is decreased to lower limit value LL (YES in S155) during the inertia traveling, ECU 300 drives motor generator 130 using the high driving power set in S140A or S145A, thereby performing the acceleration traveling (S172A).

Further, when vehicle speed SPD is increased to upper limit value UL during the acceleration traveling (YES in S150), ECU 300 proceeds the process to S160A so as to determine whether or not vehicle 100 is currently traveling on an uphill and the SOC of power storage device 110 is more than lower limit value SLL.

When the vehicle is not traveling on an uphill or the SOC is equal to or less than lower limit value SLL (NO in S160A), ECU 300 stops motor generator 130 and performs the inertia traveling (S170).

Meanwhile, when the vehicle is traveling on an uphill and the SOC is more than lower limit value SLL (YES in S160A), ECU 300 performs the inertial traveling while operating motor generator 130 with low driving power compensating for deceleration increased due to influence to gravity (S171A).

When the user's requested power is fluctuated (NO in S110), the power changing driving is suspended (S125), and the vehicle is accelerating (YES in S127), ECU 300 accelerates by driving motor generator 130 (S176). Meanwhile, when the vehicle is decelerating (NO in S127) and deceleration by inertia traveling with motor generator 130 being stopped or more prompt deceleration is required, ECU 300 performs deceleration involving regenerative braking with motor generator 130 being driven in a regenerative state (S178). Alternatively, the deceleration may be performed by switching between the deceleration employing the inertia traveling and the deceleration involving the regenerative braking.

By performing the control in accordance with the process described above, the power changing driving, in which the inertia traveling and the acceleration traveling are repeatedly performed, can be performed when the user's requested power is substantially constant. When traveling on an uphill involving a change in inclination of the road surface, the driving power of the motor generator is increased in accordance with increase of the inclination in the upward direction. Further, by easing up the lower limit value of the SOC of the power storage device during traveling on the uphill, the inertia traveling can be continued at least until the vehicle finishes traveling up the uphill. In this way, the vehicle speed can be suppressed from being decreased on the uphill due to influence of gravity, while improving energy efficiency during the vehicle traveling.

[Second Embodiment]

Described in the first embodiment is the inertia traveling control performed in the case where a single motor generator is provided as the driving source.

In the second embodiment, the following describes a case where the inertia traveling control is applied to a hybrid vehicle including motor generators and an engine.

Figure 6:
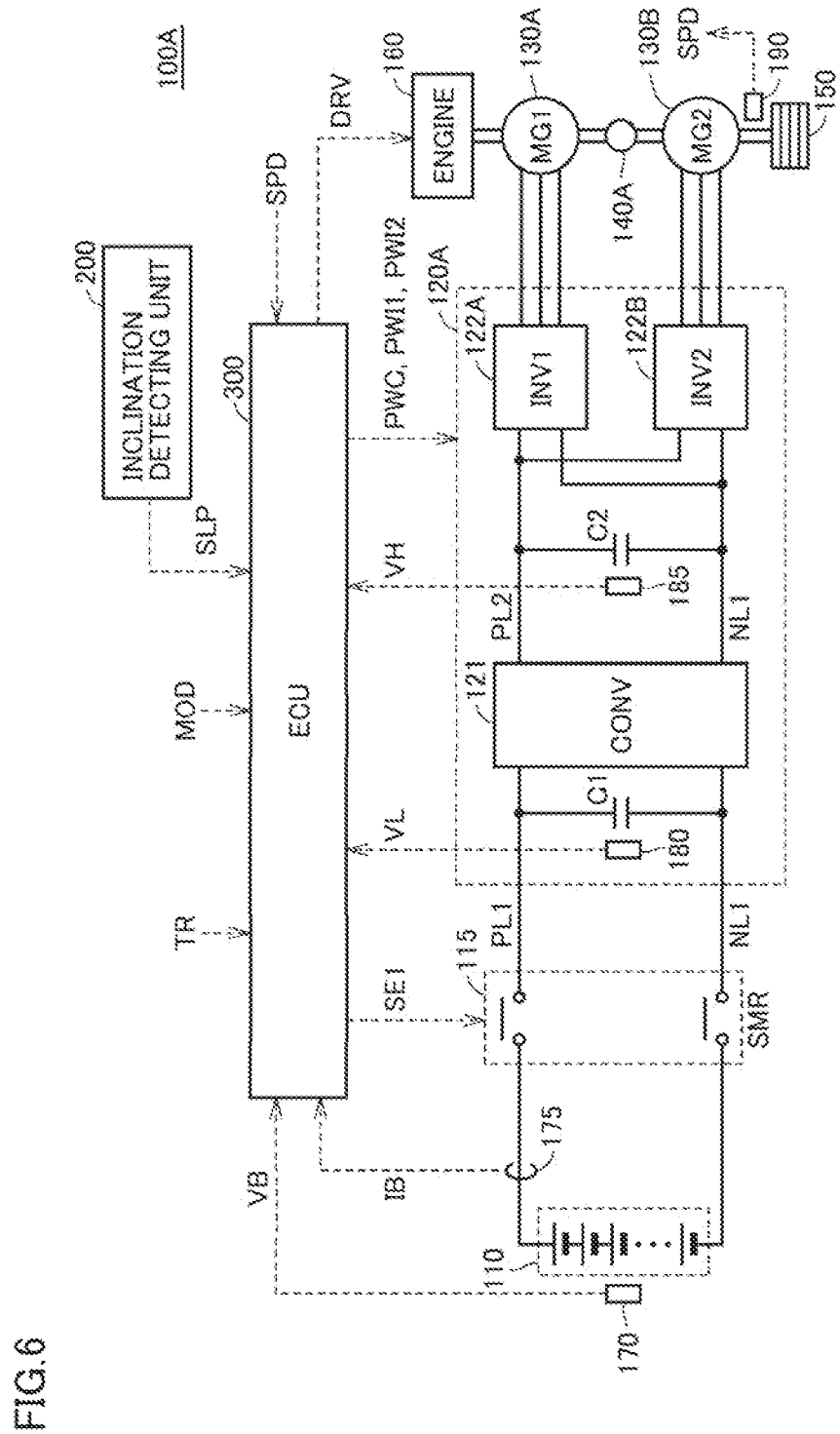
FIG. 6 is an overall block diagram of a hybrid vehicle according to a second embodiment.

FIG. 6 is an overall block diagram of a hybrid vehicle 100A according to the second embodiment. In FIG. 6, PCU 120 in FIG. 1 is replaced with a PCU 120A, motor generators 130A, 130B and an engine 160 are provided as the driving sources instead of motor generator 130. In FIG. 6, the same components as those in FIG. 1 are not described repeatedly.

Referring to FIG. 6, PCU 120A includes a converter 121, inverters 122A, 122B, capacitors C1, C2, and voltage sensors 180, 185.

Inverters 122A, 122B are connected to converter 121 in parallel via power lines PL2, NL1.

Inverter 122A is controlled in accordance with a control signal PW11 from ECU 300, and converts direct-current power supplied from converter 121 into alternating-current power so as to drive motor generator 130A (hereinafter, also referred to as "MG1"). Further inverter 122A converts alternating-current power generated by motor generator 130A into direct-current power so as to charge power storage device 110 via converter 121.

Inverter 122B is controlled in accordance with a control signal PW12 from ECU 300, and converts direct-current power supplied from converter 121 into alternating-current power so as to drive motor generator 130B (hereinafter, also referred to as "MG2"). Further, inverter 122B converts alternating-current power generated by motor generator 130B into direct-current power so as to charge power storage device 110 via converter 121.

Each of output shafts of motor generators 130A, 130B is coupled to a power transmission gear 140A configured to include a power split device such as a planetary gear, for example. Then, driving power from motor generators 130A, 130B is transmitted to driving wheels 150.

Further, motor generators 130A, 130B are also coupled to engine 160 via power transmission gear 140A. Engine 160 is controlled in accordance with a control signal DRV sent from ECU 300. Driving power generated by engine 160 is transmitted to driving wheels 150 and motor generator 130A via power transmission gear 140A. ECU 300 cooperatively controls driving powers generated by motor generators 130A, 130B, and engine 160, thereby traveling the vehicle.

It should be noted that in the second embodiment, motor generator 130A is used as a starter motor for starting engine 160, and is exclusively used as a power generator driven by engine 160 to generate electric power. Further, motor generator 130B is exclusively used as a motor to drive driving wheels 150 using electric power supplied from power storage device 110.

Further, FIG. 6 shows an exemplary configuration including two motor generators and one engine, but the number of the motor generators is not limited to this. For example, one motor generator may be provided. Alternatively, more than two motor generators may be provided.

Figure 7:
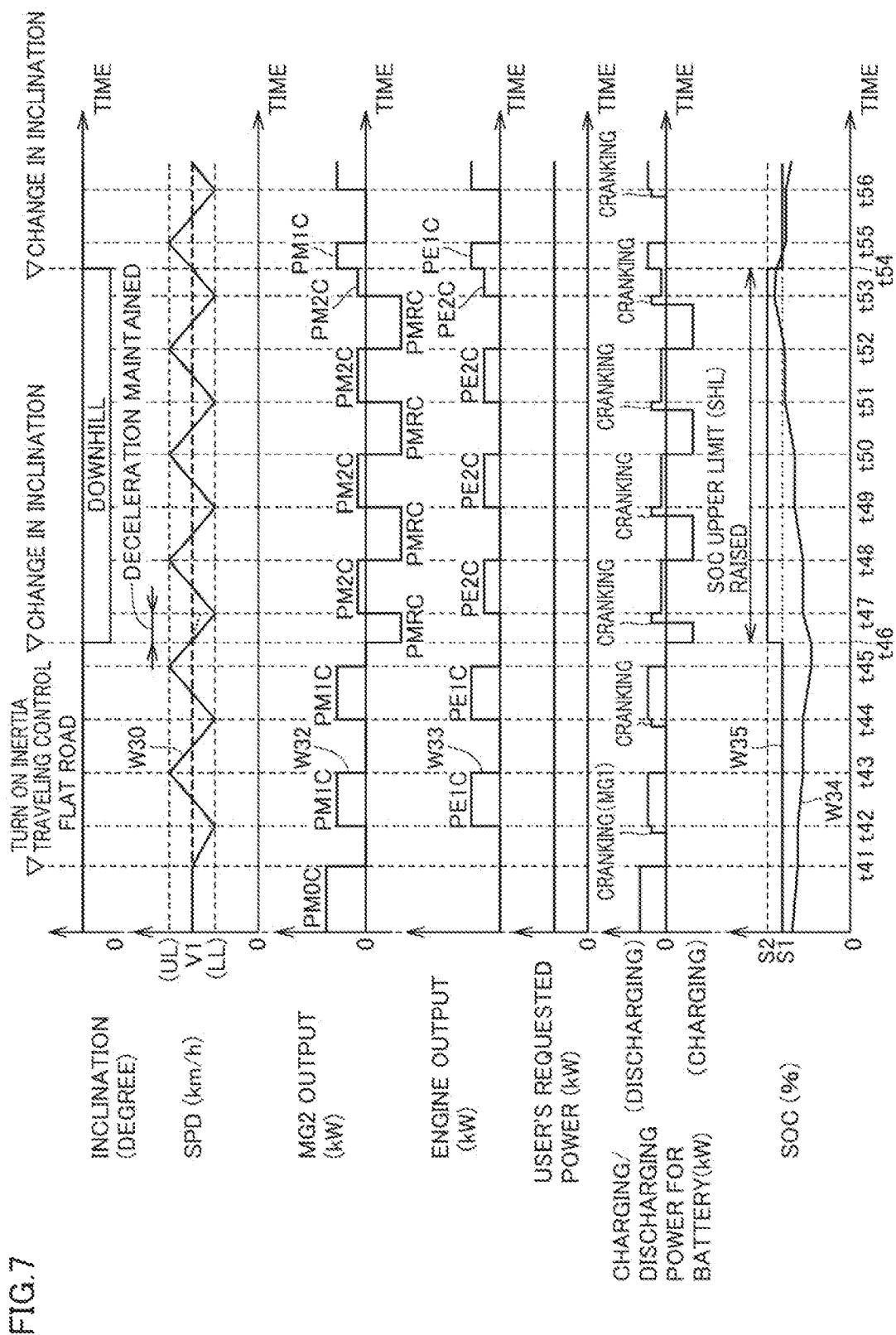
FIG. 7 is a time chart for illustrating gist of inertia traveling control when traveling on a downhill in the second embodiment.
Figure 8:
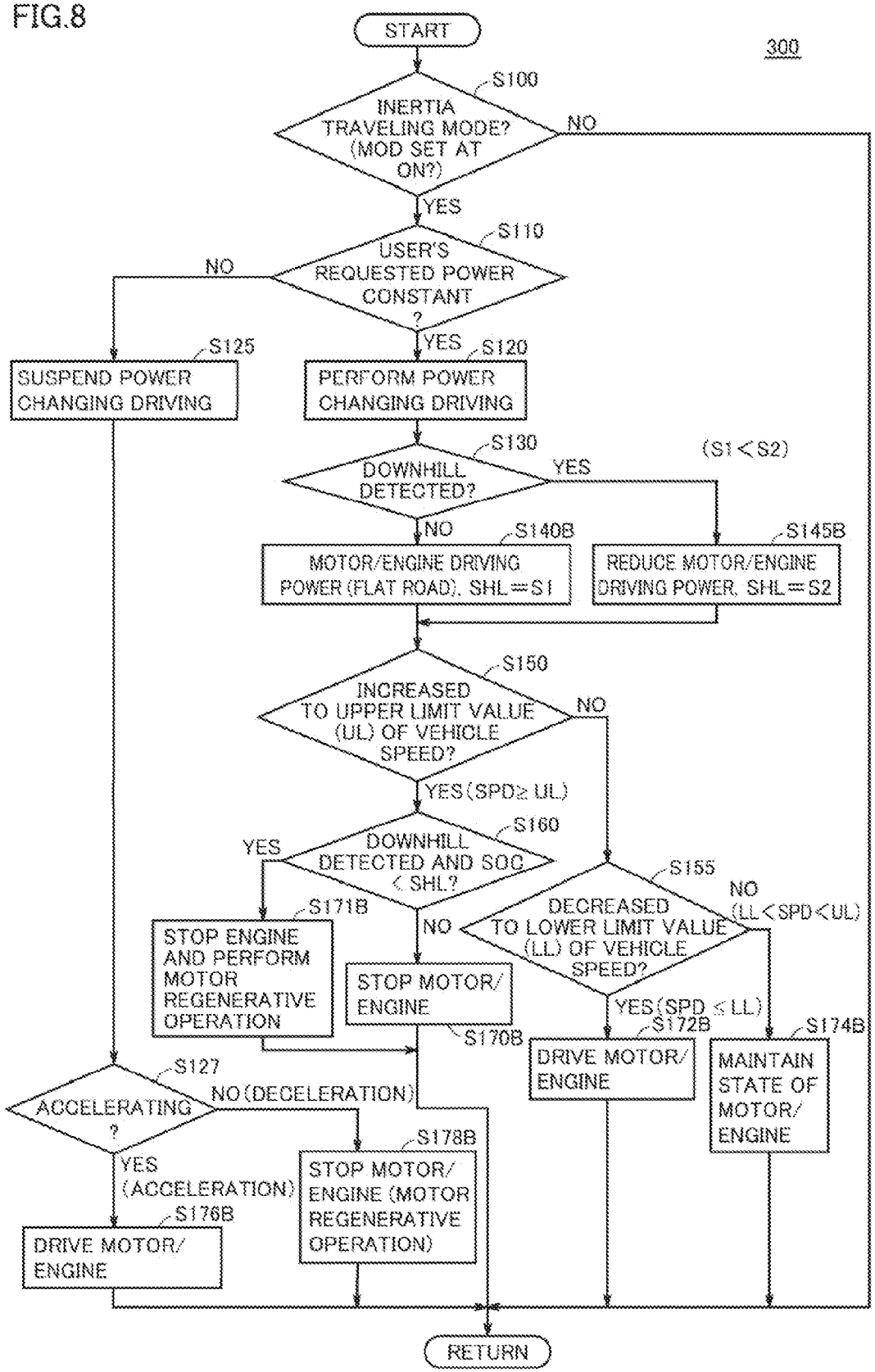
FIG. 8 is a flowchart for illustrating an inertia traveling control process performed by an ECU when traveling on the downhill in the second embodiment.

Referring to FIG. 7 and FIG. 8, the following describes the inertia traveling control in the second embodiment. FIG. 7 is a time chart for illustrating gist of the inertia traveling control in the second embodiment. The horizontal axis represents time. The vertical axis represents inclination of a road surface, vehicle speed SPD, out of the motor generator (MG2), output of the engine, the user's requested power, and charging/discharging power for the power storage device. As an example, FIG. 7 and FIG. 8 illustrate a case where the vehicle travels on a downhill, but the present invention can be also applied to a case where the vehicle travels on an uphill as with the first embodiment.

Referring to FIG. 7, in the second embodiment, driving power for the acceleration traveling in the inertia traveling control is generated using driving power supplied from motor generator 130B and driving power supplied from engine 160. Specifically, in FIG. 7, during a period of time t41 to t46 in which the vehicle travels on a flat road, a total of driving power PM1C supplied from motor generator 130B and driving power PE1C supplied from engine 160 is set to be larger than driving power PM0C required to maintain the vehicle speed. Meanwhile, after time t46 in which the vehicle travels on a downhill, a total of driving power PM2C supplied from motor generator 130B and driving power PE2C supplied from engine 160 is set to be smaller than the total driving power for the traveling on flat road.

It should be noted that a ratio of the driving power supplied from motor generator 130B and the driving power supplied from engine 160 in the acceleration traveling is appropriately set in consideration of energy efficiency of motor generator 130B and engine 160 so as to attain high energy efficiency in total.

Further, in FIG. 7, engine 160 is started whenever the acceleration traveling is performed. Hence, engine 160 is cranked by motor generator 130A (MG1) just before performing the acceleration traveling.

FIG. 8 is a flowchart for illustrating an inertia traveling control process performed by ECU 300 in the second embodiment. FIG. 8 is a figure in which steps S140, S145, S170, S172, S174, S176, and S178 in the flowchart of FIG. 3 of the first embodiment are respectively replaced with S140B, S145B, S170B, S172B, S174B, S176B, and S178B. In FIG. 8, the same steps as those in FIG. 3 are not described repeatedly.

Referring to FIG. 6 and FIG. 8, S140B, S145B, S170B, S172B, S174B, S176B, and S178B in FIG. 8 are respectively obtained by adding driving conditions for engine 160 in addition to motor generator 130B (MG2) to S140, S145, S170, S172, S174, S176, and S178 of FIG. 3.

When the user's requested power is constant (YES in S110) and the power changing driving is performed (S120), ECU 300 sets the driving power of each of motor generator 130B and engine 160 in the acceleration traveling and sets upper limit value SHL of the SOC in accordance with whether or not the road surface is an downhill. Specifically, when the vehicle is not traveling on a downhill (NO in S130), ECU 300 selects the driving power for traveling on a flat road, and sets upper limit value SHL of the SOC at S1 (S140B). Meanwhile, when the vehicle is traveling on a downhill (YES in S130), ECU 300 sets driving powers for motor generator 130B and engine 160 such that they are smaller than those employed for flat road, in consideration of influence of gravity (S145B).

When vehicle speed SPD is decreased to lower limit value LL (YES in S155), ECU 300 drives MG2 and engine 160 using the driving power set in S140B or S145B, thereby performing the acceleration traveling (S172B).

Further, when vehicle speed SPD is increased to upper limit value UL (YES in S150) and the vehicle is not traveling on a downhill or the SOC is equal to or more than upper limit value SHL (NO in S160), ECU 300 stops MG2 and engine 160, thereby performing the inertia traveling (S170B).

Meanwhile, when the vehicle is traveling on a downhill and the SOC is less than upper limit value SHL (YES in S160), engine 160 is stopped and regenerative operation of motor generator 130B is performed (S171B).

Further, when the user's requested power is fluctuated (NO in S110), the power changing driving is suspended (S125), and the vehicle is accelerating (YES in S127), ECU 300 accelerates using MG2 or using MG2 and engine 160 (S176B). Meanwhile, when the vehicle is decelerating (NO in S127), ECU 300 stops engine 160, and stops MG2 or switches MG2 to a low output state, so as to decelerate (S178B). It should be noted that for the deceleration, regenerative operation of MG2 may be performed.

By performing the control in accordance with the above-described process, the inertia traveling control taking the downhill into consideration can be performed to improve energy efficiency and driveability in the hybrid vehicle employing the engine and the motor generators as the driving sources.

It should be noted that the description above has illustrated the case where both the driving power of MG2 for downhill and the driving power of engine 160 for downhill in the acceleration traveling are made smaller than those for flat road, but one of the driving power of MG2 and the driving power of engine 160 may be made smaller in consideration of energy efficiency of MG2 and engine 160, responsiveness of the driving power, and the like. Further, in a specific case or a specific timing, the total driving power may be output from one of MG2 and engine 160.

Although not shown in FIG. 7 and FIG. 8, MG2 may be operated to provide low driving power during the inertia traveling on flat road and engine 160 may be operated to provide low driving power during the inertia traveling on flat road and/or downhill.

[Third Embodiment]

In the second embodiment, the hybrid vehicle including the engine and the motor generators as the plurality of driving sources has been described and illustrated. However, the present invention can be applied to a vehicle having a different configuration, such as an electric vehicle having a twin motor configuration and capable of traveling using driving power from each of two motor generators serving as a plurality of driving sources as shown in FIG. 9, for example.

Figure 9:
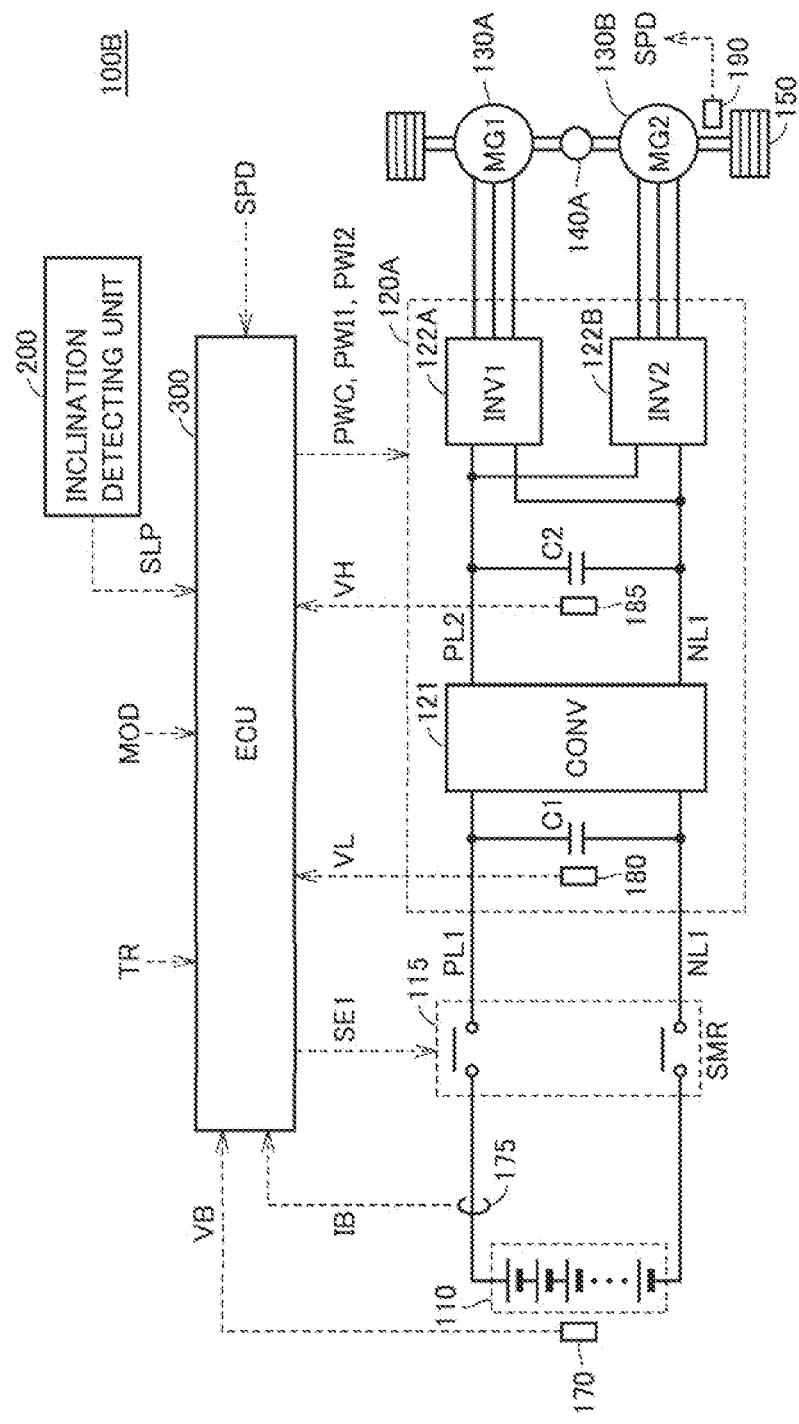
FIG. 9 is an overall block diagram of a vehicle according to a third embodiment in which two motor generators are employed as driving sources.

Vehicle 100B of FIG. 9 has a configuration in which no engine 160 is provided in vehicle 100A of FIG. 6. Vehicle 100B travels using both driving power of motor generator 130A (MG1) and driving power of motor generator 130B (MG2).

In this case, unlike in the second embodiment, power storage device 110 cannot be charged using motor generator 130A (MG1). However, by replacing the driving power of engine 160 in FIG. 7 of the second embodiment with the driving power of MG1, the power changing driving can be performed.

Further, in the configuration of FIG. 6 of the second embodiment, the present invention is applicable also in the case where MG1 is also used as a motor rather than a power generator and traveling is performed using driving power generated by the three driving sources, i.e., MG1, MG2, and engine 160.

The embodiments disclosed herein are illustrative and non-restrictive in any respect. The scope of the present invention is defined by the terms of the claims, rather than the embodiments described above, and is intended to include any modifications within the scope and the meaning equivalent to the terms of the claims.

REFERENCE SIGNS LIST 100, 100A, 100B: vehicle; 110: power storage device; 115: SMR; 120: PCU; 121: converter; 122, 122A, 122B: inverter, 130, 130A, 130B: motor generator; 140, 140A: power transmission gear; 150: driving wheel; 160: engine; 170, 180, 185:

voltage sensor; 175: current sensor; 190: speed sensor; 200; inclination detecting unit; 300: ECU; C1, C2: capacitor, PL1, PL2, NL1: power line

The invention claimed is:

1. A vehicle comprising:
   a power storage device;
   a rotating electrical machine that generates traveling driving power for the vehicle using electric power from the power storage device;
   a control device for controlling the rotating electrical machine; and
   an inclination detecting unit for detecting inclination of a road surface,
   wherein
   the control device performing power changing driving in which the vehicle is traveled while switching the rotating electrical machine between a first state and a second state, driving power of a first level being generated in the first state, driving power in the second state being made smaller than the driving power in the first state, and
   when the control device recognizes, based on the inclination detected by the inclination detecting unit, that the vehicle is traveling on a road surface having a slope, the control device easing up at least one of an upper limit value and a lower limit value of a state of charge, the upper limit value and the lower limit value defining a permitted range of charging/discharging for the power storage device
   when the vehicle is traveling downhill, the control device causing the rotating electrical machine to perform a regenerative operation so as to provide the vehicle with braking force and charge the power storage device with electric power generated by the rotating electrical machine in the second state, and the control device increasing the upper limit value of the state of charge of the power storage device as compared with the upper limit value employed for traveling of the vehicle on a flat road.

2. The vehicle according to claim 1, wherein
   when the vehicle is traveling uphill, the control device increases the driving power in the second state as compared with the driving power employed for traveling of the vehicle on a flat road, and
   when the vehicle is traveling on the uphill, the control device decreases the lower limit value of the state of charge of the power storage device as compared with the traveling of the vehicle on the flat road.

3. The vehicle according to claim 1, wherein the control device performs the power changing driving when a change in a user's requested driving power falls within a predetermined range.

4. The vehicle according to claim 1, wherein while the power changing driving is performed, the control device switches between the first and second states so as to maintain speed of the vehicle in the permitted range.

5. The vehicle according to claim 4, wherein the control device makes switching to the first state in response to a decrease of the speed of the vehicle to a lower limit value of the permitted range, and makes switching to the second state in response to an increase of the speed of the vehicle to an upper limit value of the permitted range.

6. The vehicle according to claim 1, further comprising another driving source that generates the traveling driving power of the vehicle, wherein
   the control device performs power changing driving in which said another driving source is switched between a third state and a fourth state, driving power of a second level being generated in the third state, driving power in the fourth state being made smaller than the driving power in the third state.

7. The vehicle according to claim 6, wherein said another driving source is an engine.

8. The vehicle according to claim 6, wherein said another driving source is another rotating electrical machine different from the rotating electrical machine.

9. A method for controlling a vehicle including a power storage device, a rotating electrical machine that generates traveling driving power for the vehicle using electric power from the power storage device, and an inclination detecting unit for detecting inclination of a road surface, the method comprising the steps of:
   bringing the rotating electrical machine into a first state in which driving power of a predetermined level is generated;
   bringing the rotating electrical machine into a second state in which driving power is made smaller than the driving power in the first state;
   performing power changing driving in which the vehicle is traveled while switching between the first and second states;
   easing up at least one of an upper limit value and a lower limit value of a state of charge when recognizing, based on the inclination detected by the inclination detecting unit, that the vehicle is traveling on a road surface having a slope, the upper limit value and the lower limit value defining a permitted range of charging/discharging for the power storage device, and
   when the vehicle is traveling downhill, causing the rotating electrical machine to perform a regenerative operation so as to provide the vehicle with braking force and charge the power storage device with electric power generated y the rotating electrical machine in the second state, and increasing the upper limit value of the state of charge of the power storage device as compared with the upper limit value employed for traveling of the vehicle on a flat road.

* * * * *